US010972551B1

(12) United States Patent
Schlosser et al.

(10) Patent No.: US 10,972,551 B1
(45) Date of Patent: Apr. 6, 2021

(54) BUILDING MOBILE APPLICATIONS ON STATEFUL BACKEND SYSTEMS

(71) Applicant: SAP SE, Walldorf (DE)

(72) Inventors: Andreas Schlosser, Weiterstadt (DE); Christian Denkel, Jöhlingen (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/601,167

(22) Filed: Oct. 14, 2019

(51) Int. Cl.
*G06F 15/173* (2006.01)
*G06F 15/16* (2006.01)
*H04L 29/08* (2006.01)

(52) U.S. Cl.
CPC ............ *H04L 67/141* (2013.01); *H04L 67/32* (2013.01); *H04L 67/10* (2013.01)

(58) Field of Classification Search
CPC ....... H04L 67/141; H04L 67/32; H04L 67/10; H04L 67/42; H04L 47/803
USPC .......................................................... 709/228
See application file for complete search history.

(56) References Cited

U.S. PATENT DOCUMENTS

| 2005/0203994 | A1* | 9/2005 | Palmer | H04Q 3/0025 709/203 |
| 2009/0064148 | A1* | 3/2009 | Jaeck | H04L 67/148 718/101 |
| 2009/0328040 | A1* | 12/2009 | Miller | G06F 9/54 718/100 |
| 2011/0040826 | A1* | 2/2011 | Chadzelek | H04L 67/142 709/203 |
| 2013/0019000 | A1* | 1/2013 | Markus | G06F 9/466 709/223 |
| 2014/0280845 | A1* | 9/2014 | Owens | H04L 67/1095 709/223 |
| 2016/0253304 | A1* | 9/2016 | Evers | G06F 40/166 715/225 |
| 2016/0301758 | A1* | 10/2016 | Said | H04L 67/1002 |
| 2017/0155736 | A1* | 6/2017 | Schukovets | H04L 67/02 |
| 2017/0329581 | A1* | 11/2017 | Jann | G06F 8/38 |

* cited by examiner

*Primary Examiner* — Ruolei Zong
(74) *Attorney, Agent, or Firm* — Sterne, Kessler, Goldstein & Fox P.L.L.C.

(57) ABSTRACT

Disclosed herein are system, method, and computer program product embodiments for building a stateless connector to a stateful backend system. The stateless connector allows developers to deploy mobile applications that interact with the stateful backend system without refurbishing the backend system to accommodate stateless design methodologies and access functions. The stateless connector thus provides a bridge between a stateless application and a stateful backend system without requiring any risky and potentially disruptive updates the backend system. The stateless connector may be generated and deployed automatically based on a recording of user interactions with stateful application server. This saves an enormous amount of time and effort in the application development process and allows application developers to focus their time and efforts on the presentation components and business logic of the mobile application.

20 Claims, 6 Drawing Sheets

FIG. 3

BUILDING MOBILE APPLICATIONS ON STATEFUL BACKEND SYSTEMS

BACKGROUND

A cloud platform may provide customers with facilities, tools, and components to create, deploy, and manage customized software applications. The facilities provided by the cloud platform may include application and front-end servers, backend data systems, development toolkits, networks and systems, and a wide-array of other components and tools. In some use cases, customer's software applications may be designed using a stateful methodology where the application tracks prior interactions with and requests from users while managing session information. However, in other use cases, the software applications may need to function in a stateless manner, e.g., when operating in a mobile-application design paradigm.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIG. 3 is an example screen display of a recording tool in a cloud platform displaying a details panel, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1A:
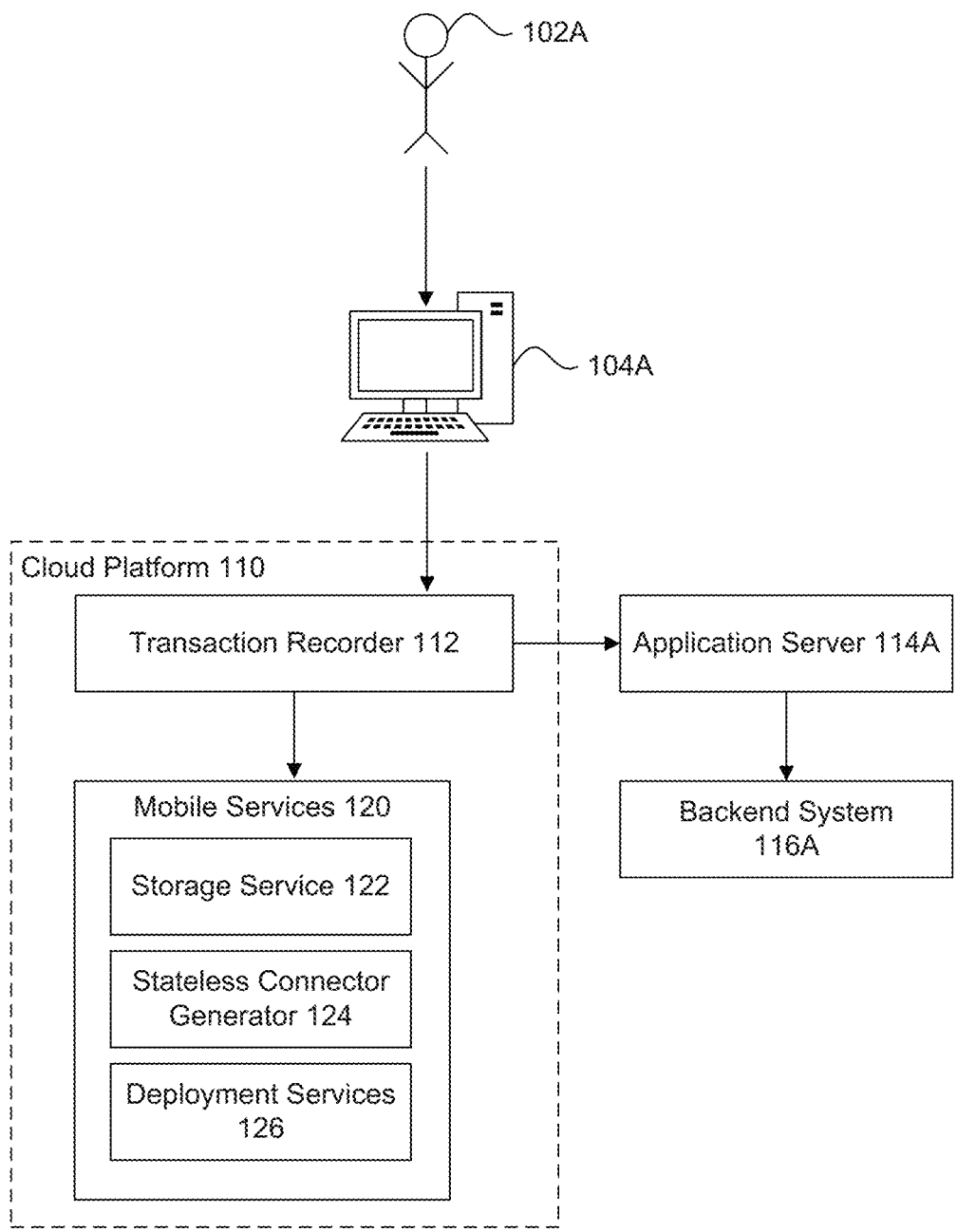
FIG. 1A is a block diagram of design-time components in a cloud platform in an application environment, according to some embodiments.

Provided herein are system, apparatus, device, method and/or computer program product embodiments, and/or combinations and sub-combinations thereof, for building and deploying a stateless connector that allows stateless applications to access a stateful backend system without modifying the backend system.

A cloud platform may provide tools that allow organizations and individuals to build, deploy, and maintain software applications. Generally speaking, an application may be a user interface, device, application, or other system that derives, assembles, collects, manipulates, stores, and/or archives data and presents this data in an appropriate fashion to users. The range, nature, and character of such applications is vast, and such software applications are harnessed across multitudinous industries, services, trades, and pursuits. A cloud platform may advance a software-as-a-service model, providing organizations with hardware components, e.g., application servers, databases, routers, load balancers, etc., management services, e.g., hosting, data storage, analytics, machine learning, etc., and other suitable software components. By managing the infrastructure and providing configuration tools with a cloud platform, an organization may rapidly build, deploy, maintain, and update customized software applications. Additionally, a cloud platform may furnish a variety of backend systems and data storage options to house application-relevant data. A cloud platform may provide access to the backend data through suitable drivers, application programming interfaces, querying mechanisms, and/or other suitable protocols, for example, OData.

Applications in a cloud platform may adhere to a stateful design methodology and interact with backend systems that accommodate such stateful applications. A stateful application may preserve a state from one user interaction to the next by storing information about prior interactions. For example, a stateful backend system may store information about users' sessions such as session identifiers, authentication credentials, and details about prior completed actions.

By way of illustrative example, when a customer logs into a bank's website, the customer may view account information and complete various actions pertinent to their personal accounts. In such an stateful application, when the user enters an input, e.g., clicking on a particular account, a request is transmitted to the application server, which processes the request. The subsequent details page returned by the application server displays without requiring the user to re-authenticate. This functionality is possible because the tool retains the session information as well as information about where the user was within the tool in a stateful backend system. Thus, despite the fact that the HTTP protocol itself is stateless, by using a stateful design methodology, the bank's website may recall details of previous interactions stored in the stateful backend system.

In this fashion, the experience of a stateful application appears to the user to be continuous and uninterrupted. Stateful systems, however, may require constant synchronization between a user's computing device and the application (e.g., problems may arise if the user loses connectivity). Stateful systems may be expensive to build and manage. Stateful systems may require additional resources such as memory and hard-disk storage.

Conversely, other applications employ a stateless design methodology with respect to their interactions with backend systems. A stateless application does not record prior user interactions, and an application server (or other suitable agent) handles user requests entirely based on information contained within that particular request. Thus, requests in a stateless application may be self-contained, i.e., all information needed for the application server to process the request may be contained within the request itself. Stateless applications have become increasingly prevalent given their advantages over stateful applications. For example, mobile developers frequently build mobile applications using stateless design methodologies to optimize performance and eliminate the need for continuous synchronization with application servers.

By way of illustrative example, one such stateless application may be a social media application running on a mobile device. Such a stateless application may adhere to a stateless protocol, where no relationship exists between prior, present, and future user requests. Instead, in response to single request from a mobile device, the application server (or other suitable responsive, server-side entity or agent) may provide a list of recent messages independent of any stored state, perhaps limited to messages in the system compared to a timestamp (which would necessarily be included in the stateless request). One skilled in the relevant art(s) will understand that the functions and data access methods provided by a stateless backend system differ from those used in a stateful backend system.

For various business and practical reasons, organizations may need to build a stateless application that accesses data stored in a stateful backend system. Organizations may also need to deploy a stateless version of an otherwise stateful application. For example, an organization may provide a mobile application that performs functions similar to a version of a web application accessed through a web browser.

However, organizations frequently encounter difficulties and problems when building and deploying mobile applications that interact with stateful backend systems. For one, a massive amount of effort is required to update a stateful backend system to expose backend data for consumption by stateless applications through appropriate methods and functions. Thus, instead of the mobile-application developer spending time building an immersive user interface and tailoring business processes to the mobile experience, the developer may spend significant time updating the backend system to provide stateless access methods. For example, the developer may have to update the backend system to expose data-manipulation functions, provide access to particular fields while preventing access to other fields include specialized tables and other data structures, etc.

In addition to the massive amount of time and resources spent updating a backend system, additional problems may arise for organizations conducting such updates. Mobile application developers may have an aptitude for conducting presentation layer updates but lack experience with backend systems. Thus, a development team may have to integrate additional individuals having familiarity with backend systems. Moreover, because the backend systems may be production environments, an untenable amount of risk may be involved in conducting the sweeping updates to the backend system necessary to allow the backend system to serve stateless applications. Such updates may require system downtime, which may not be agreeable to some industries, businesses, and/or applications. In some organizations, updates to the backend systems may present additional regulatory hurdles and procedural requirements. The cumulative impact of these issues may lead to adoption hesitancy and render organizations unwilling to deploy mobile applications on a cloud platform.

Accordingly, a need exists for building and deploying a stateless connector to allow a mobile application to connect to a stateful backend system. Such a stateless connector allows developers to deploy mobile applications that harness, leverage, and interact with a stateful backend system, providing a useful bridge between a stateless application and a stateful backend system without requiring any changes to the underlying backend system. The stateless connector may be generated and deployed automatically by recording user interactions with an application server (or other suitable server-side entity or agent) as the user conducts transactions against the stateful backend system. This automation saves an enormous amount of time and effort in the development process and allows application developers to focus their energy on the presentation layer and business logic of the mobile application. In addition to addressing the above needs, the embodiments of this disclosure provide a further technical improvement of simplifying the backend systems deployed within a cloud platform by allowing the backend systems to operate under a stateful protocol without having to accommodate stateless requests, making backend systems more resilient to errors, more portable, and more scalable.

FIG. 1A is a block diagram of design-time components in a cloud platform in an application environment 100A, according to some embodiments. Any operation herein may be performed by any type of structure in the diagram, such as a module or dedicated device, in hardware, software, or any combination thereof. Any block in the block diagram of FIG. 1A may be regarded as a module, apparatus, dedicated device, general-purpose processor, engine, state machine, application, functional element, or related technology capable of and configured to perform its corresponding operation(s) described herein. Environment 100A may include user 102A, device 104A, cloud platform 110, transaction recorder 112, application server 114A, backend system 116A, mobile services 120, storage service 122, stateless connector generator 124, and deployment services 126.

Users 102, such as user 102A and user 102B, may be individuals or entities designing and deploying data-driven software applications within a cloud platform. Users 102 may be human beings, but user 102 may also be artificial intelligence constructs. Users 102 may employ, i.e., connect to, a network or combination of networks including the Internet, a local area network (LAN), a wide area network (WAN), a wireless network, a cellular network, or various other types of networks as would be appreciated by a person of ordinary skill in the art. User 102A in FIG. 1A may be a developer or individual on a business team operating transaction recorder 112 (described in further detail below) at design/build time. Conversely, user 102B in FIG. 1B may be an end user operating the deployed software application. In an embodiment, user 102B may interact with the deployed software application using mobile device.

Figure 1B:
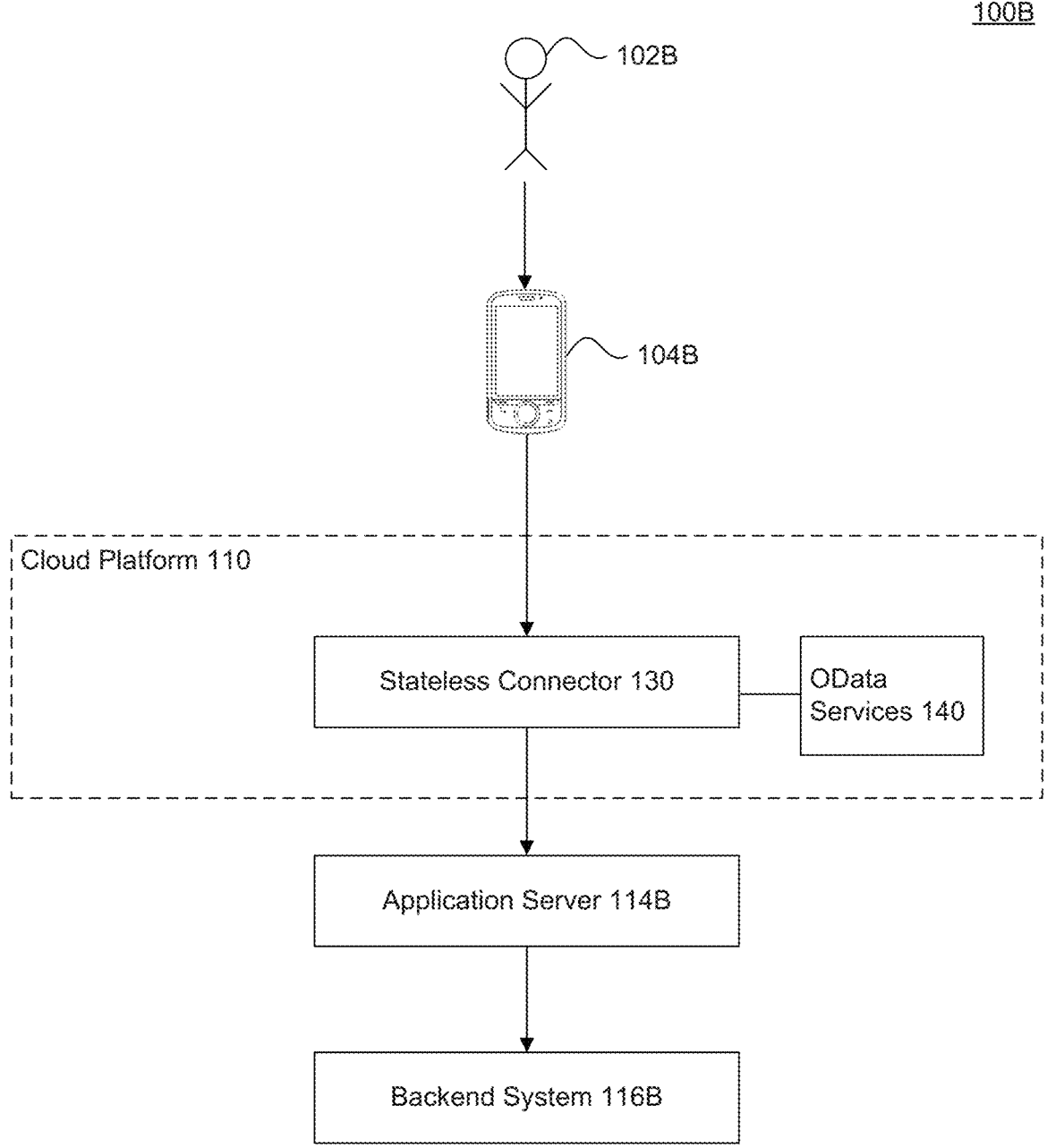
FIG. 1B is a block diagram of runtime components in a cloud platform, according to some embodiments.

Device 104A may be a personal digital assistant, desktop workstation, laptop or notebook computer. Device 104A may also be a netbook, tablet, smart phone, mobile phone, smart watch or other wearable, appliance, part of the Internet-of-Things, and/or embedded system, to name a few non-limiting examples, or any combination thereof. Although device 104A is illustrated in the example of FIG. 1 as a single computer, one skilled in the art(s) will understand that device 104A may represent two or more computers in communication with one another. Therefore, it will also be appreciated that any two or more components of environment 100A may similarly be executed using some or all of the two or more computers in communication with one another. Device 104A in FIG. 1A may be employed by a developer or member of the business team to complete a transaction using transaction recorder 112 (described in further detail below) at design/build time. That is, device 104A may be employed to record a transaction and automatically generate and deploy a stateless connector based on the recorded transaction (also described in further detail below). Conversely, device 104B in FIG. 1B may run the subsequently deployed application while adhering to a stateless design methodology. In an embodiment, device 104B may be a smart phone, mobile phone, or other mobile device running an application adhering to a stateless design methodology.

Cloud platform 110 may provide tools that allow software applications to be built, deployed, and maintained by an organization or business. For example, cloud platform 110 may facilitate the creation of customer relationship management tools, enterprise resource planning tools, commerce applications, word processing applications, communication applications, product lifecycle management tools, supply chain management, general business solutions, and many other types of applications. Cloud platform 110 may include a user interface, device, application, or other system that collects, manipulates, stores, and/or archives data. Cloud platform 110 may provide stored data to applications through a suitable interface, application programming interface, querying mechanism, and/or other suitable protocol, for example, OData. Cloud platform 110 may employ a suitable application server, web server, or other mechanism for responding to web traffic received over appropriate communication channels. Cloud platform 110 may allow application developers to deploy applications written in the advanced business application programming language or other suitable high-level programming language, e.g., C/C++, Java, Perl, etc. Cloud platform 110 may divide business applications into a presentation layer (e.g., ASP, JSP, BSP, etc.), business-logic layer (e.g., J2EE runtime environment, java beans, etc.), integration layer (connecting to other application servers or APIs), connectivity layer (e.g., HTTP, HTTPS, SSL, etc.), persistence layer (e.g., SQL, etc.), and other suitable abstractions/layers. Cloud platform 110 may provide mechanisms to authenticate incoming web traffic, interact with backend systems to formulate appropriate responses, and return these responses to software applications.

Transaction recorder 112 may provide tools used by user 102A to record a transaction within a software application. A transaction may also be referred to in the below disclosure as a dynamic program. A transaction may be a sequence of steps performed within a software application within cloud platform 110. The totality of behavior provided by a software application may be represented through collections of sequences. A step may involve input fields, i.e., a user-interface control that is part of a step in the sequence which is accessible by the mobile application for input. A step may involve output fields, i.e., a user-interface control that is part of the state after the last step of a sequence is executed, which may be displayed in a mobile application after execution of the sequence. A transaction may also include operations performed within the stateful application, e.g., payloads sent to the application server, resultant calls to the backend system, etc. Transaction recorder 112 may provide an interface that allows user 102A to conduct the transaction in a stateful interface. Transaction recorder 112 may then generate a data structure that represents the performed transaction. Transaction recorder 112 also provides facilities to user 102A to enter additional information about the transaction while recording and also to edit the resultant data structure. Transaction recorder 112 is portrayed in further detail below with reference to exemplary screen displays in FIGS. 2 and 3.

Application server 114A may be a suitable application server, web server, or other mechanism that responds to requests made by users to an application. Application server 114A may run on premise, for instance, in a hosted environment or on the cloud. In one embodiment, application server 114A may reside within cloud platform 110. However, in another embodiment, application server 114A may be situated in a different location or environment and accessed by transaction recorder 112 and/or cloud platform 110 via a suitable network connection. Application server 114A may be implemented using the advanced business application programming language or other suitable high-level programming language, e.g., C/C++, Java, Perl, etc. Response agent 122 may be divided into a presentation layer (e.g., ASP, JSP, BSP, etc.), business-logic layer (e.g., J2EE runtime environment, java beans, etc.), integration layer (connecting to other application servers or APIs), connectivity layer (e.g., HTTP, HTTPS, SSL, etc.), persistence layer (e.g., SQL, etc.), and other suitable layers. Application server 114A may authenticate incoming web traffic, interact with backend systems to formulate appropriate responses, and return these responses to users. Application server 114B is portrayed in FIG. 1B. In an embodiment, application server 114B may be coextensive with application server 114A and provide multiple GUIs/APIs for processing both stateful and stateless requests. In another embodiment, application server 114B may a server specially devoted to receiving stateless/mobile requests.

Backend system 116A may be a system that creates, stores, and maintain data used by an application in cloud platform 110. Backend system 116A may be connected to applications running in cloud platform 110 that allow users to retrieve and update data. This data may be used by software applications in a variety of ways. For example, backend system 116A may be a relational database, a NoSQL database or other horizontally scaling database, or any other database adhering to an appropriate database design methodology. Backend system 116A may harness any commercially available database management system to store data retrievable used by software applications built and deployed in cloud platform 110. Backend system 116A may implement a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. Backend system 116A may deploy a hard-disk interface, such as ATA, SATA, SCSI, SAS, and/or fibre for interfacing with storage mediums. Backend system 116A may employ tables to store data and may use a row-based or columnar organizational methodology or design. Backend system 116A may also be an in-memory database or a database management systems that employs a disk storage mechanism. Backend system 116B id portrayed in FIG. 1B. In an embodiment, backend system 116B may be coextensive with backend system 116A, i.e., the same backend system 116B may serve both a stateless and a stateless version of a particular software application. Moreover, in an embodiment, backend system 116A and backend system 116B may run on premise, for instance, in a hosted environment or on the cloud accessible by application server 114A and application server 114B. In one embodiment, backend system 116A and backend system 116B may reside within cloud platform 110. However, in another embodiment, backend system 116A and backend system 116B may be situated in a different location or environment and accessed by application server 114A and application server 114B via a suitable network connection.

Mobile services 120 may provide a variety of tools and components that enable mobile application development, configuration, and management within cloud platform 110. Mobile services 120 may provide functions specific to the development of applications in a mobile design space, e.g., offline work, push notifications, application updates, mobile security, etc. Mobile services 120 may include storage service 122, stateless connector generator 124, and deployment services 126. Mobile services 120 may receive from transaction recorder 112 a data structure describing a transaction conducted in a stateful application by user 102. Mobile services 120 may storage the data structure temporarily or permanently by engaging storage service 122.

Stateless connector generator 124 may be engaged by user 102A and/or cloud platform 110 to create a stateless connector based on a previously recorded transaction. In one embodiment, the stateless connector may create, activate, and maintain a stateless service that may be accessed by mobile application developers. The stateless connector may provide the input and output fields accessed in the transaction and the ability to perform any operations conducted against the backend system. The stateless connector generated by stateless connector generator 124 is described in further detail below as stateless connector 130.

FIG. 1B is a block diagram of runtime components in a cloud platform in an application environment 100B, according to some embodiments. Any operation herein may be performed by any type of structure in the diagram, such as a module or dedicated device, in hardware, software, or any combination thereof. Any block in the block diagram of FIG. 1B may be regarded as a module, apparatus, dedicated device, general-purpose processor, engine, state machine, application, functional element, or related technology capable of and configured to perform its corresponding operation(s) described herein. Environment 100B may include user 102B, device 104B, application server 114B, backend system 116B, and stateless connector 130.

Stateless connector 130 may provide an interface between stateless applications and a stateful backend system such as backend system 116B. Stateless connector 130 may include a definition file that defines output fields, input fields, and operations performable by stateless connector 130. The definition file may be a common schema definition language format file, entity data model designer file, other XML file, or other suitable file or data structure that defines an entity model to be exposed by an OData service. For example, if user 102A records the above-described banking application transaction by viewing a details page, a resultant, auto-generated stateless connector 130 may provide access to a stateless application to view input and output fields contained on the details page for the accounts and to interact with the backend system to gather details. Stateless connector 130 may also include parameters and services used to instantiate a stateless service for access by developers of mobile applications. Stateless connector 130 may also be used to auto-generate templates for a mobile application based on the input fields, output fields, and operations contained therein.

OData services 140 may be a REST-based protocol for querying and updating data. OData services 140 may be built on standardized technologies such as HTTP, Atom/XML, and JSON. OData services 140 may provide various functions and standardized data models. For example, OData services 140 may support CRUD (Create, Read, Update, Delete) operations for creating and consuming data. In an alternate embodiment, OData services 140 may leverage ODBC, JDBC, .NET, or other suitable access methodology. Once stateless connector 130 is deployed by mobile services 120, mobile application developers may engage OData services 140 to receive information about input fields, output fields, and methods available via the stateless connector.

Figure 2:
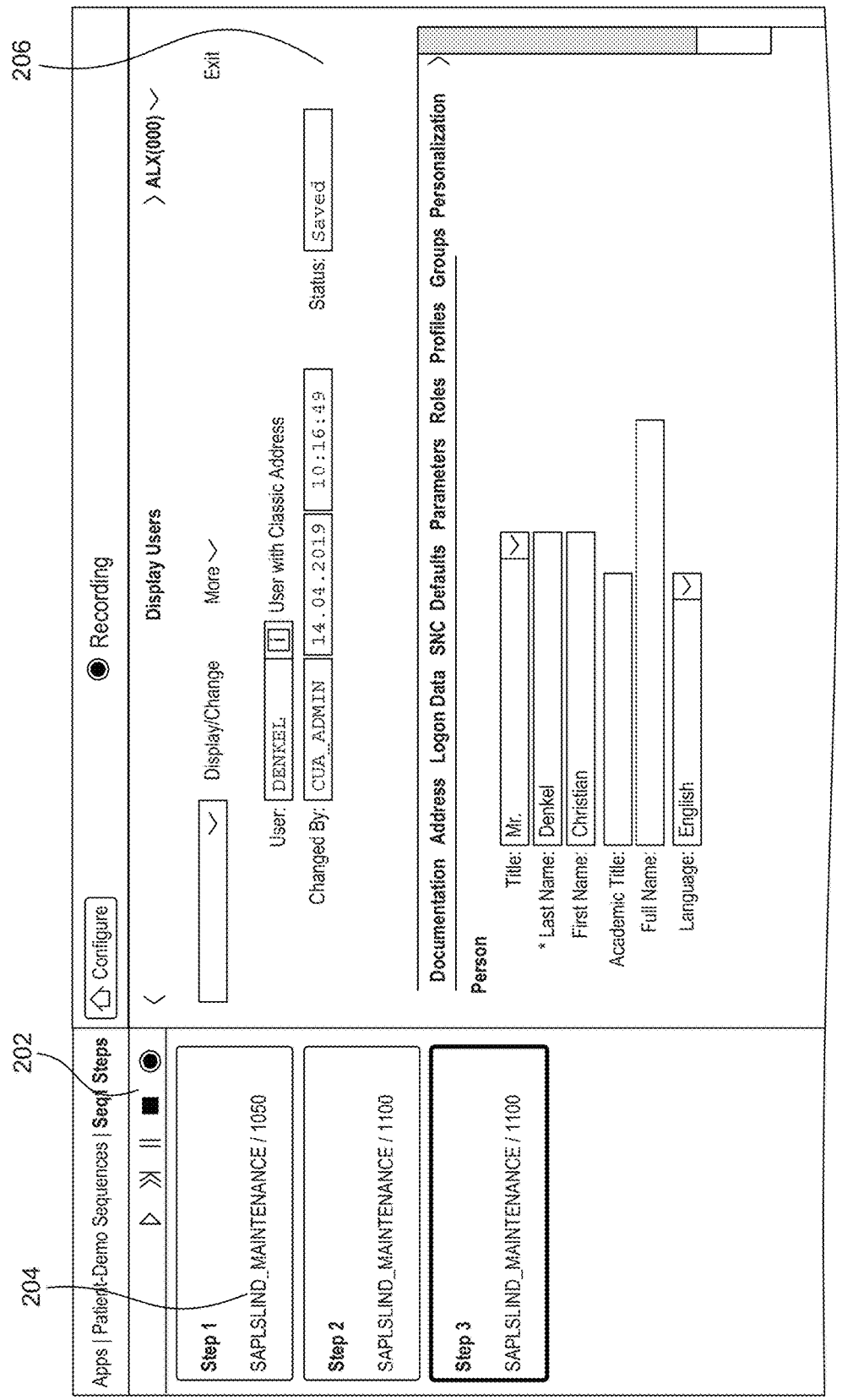
FIG. 2 is an example screen display of a recording tool in a cloud platform, according to some embodiments.

FIG. 2 is an example screen display 200 of a recording tool in a cloud platform, according to some embodiments. The screen display provided in FIG. 2 is merely exemplary, and one skilled in the relevant art(s) will appreciate that many approaches may be taken to provide a suitable screen display 200 in accordance with this disclosure. Exemplary screen display 200 includes control bar 202, steps 204, and application 206.

Control bar 202 may provide user 102A with options to navigate through the recording tool. For example, control bar 202 may include options to start recording a transaction, stop recording a transaction, pause a recording, fast-forward, rewind, and other suitable commands. These are merely exemplary options however, and additional controls and navigation options may be provided within control bar 202.

Steps 204 may display the steps recorded as part of the current transaction. The steps may make up a sequence. By displaying steps 204, user 102A may be able to select a step to review. User 102A may include additional details about these actions for eventual inclusion in the generated stateless connector. Steps 204 may be saved and user 102A may return to the tool at a later time to view the retained steps.

Application 206 may be a software application running in cloud platform 110. Application 206 may access backend system 116A via application server 114A where the application server employs a stateful interaction methodology. The example provided in exemplary screen display 200 displays application 206 that allows user 102A to edit a user's information in the system. One skilled in the relevant arts will understand that a wide variety of applications may be displayed and interacted with using a stateful interaction methodology.

Figure 3:
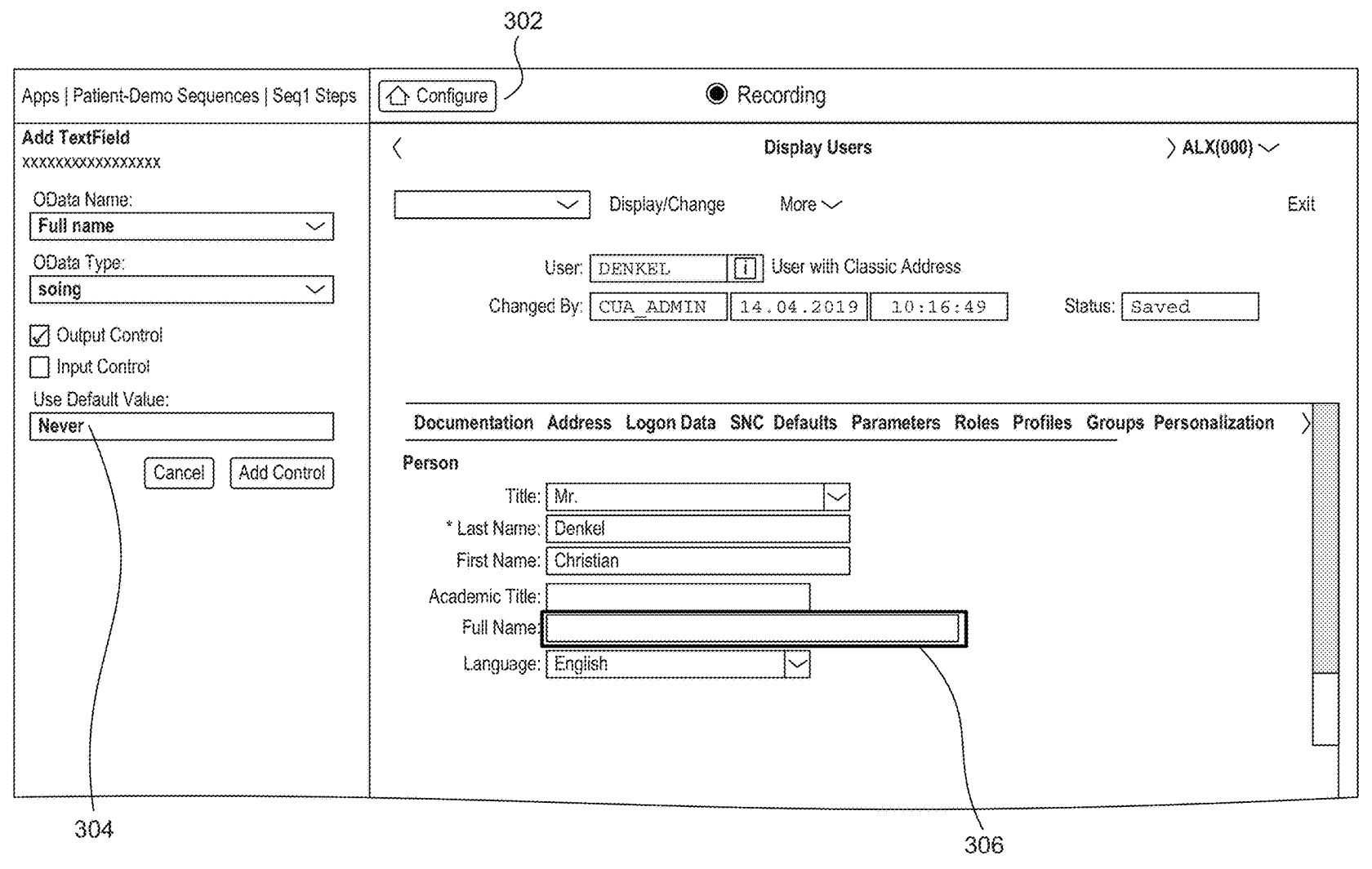

FIG. 3 is an example screen display 300 of a recording tool in a cloud platform displaying a details panel, according to some embodiments. The screen display provided in FIG. 3 is merely exemplary, and one skilled in the relevant art(s) will appreciate that many approaches may be taken to provide a suitable screen display 300 in accordance with this disclosure. Exemplary screen display 300A includes configure button 302, details panel 304, and selected field 306.

Configure button 302 may be selected by user 102A to load details panel 304. Details panel 304 may allow user 102A to edit information about a step being performed in a transaction. Selected field 306 may be a field in application 206 being examined by user 102A. Here the field "Full Name" selected. Accordingly, the details for the "Full Name" field are displayed in details panel. User 102A may be able to enter a default value for the field, update the field type, and assign a new Name or Label to a field. These additional modifications may be associated by transaction recorder 112 with the step in the transaction for later inclusion in stateless connector 130.

Figure 4:
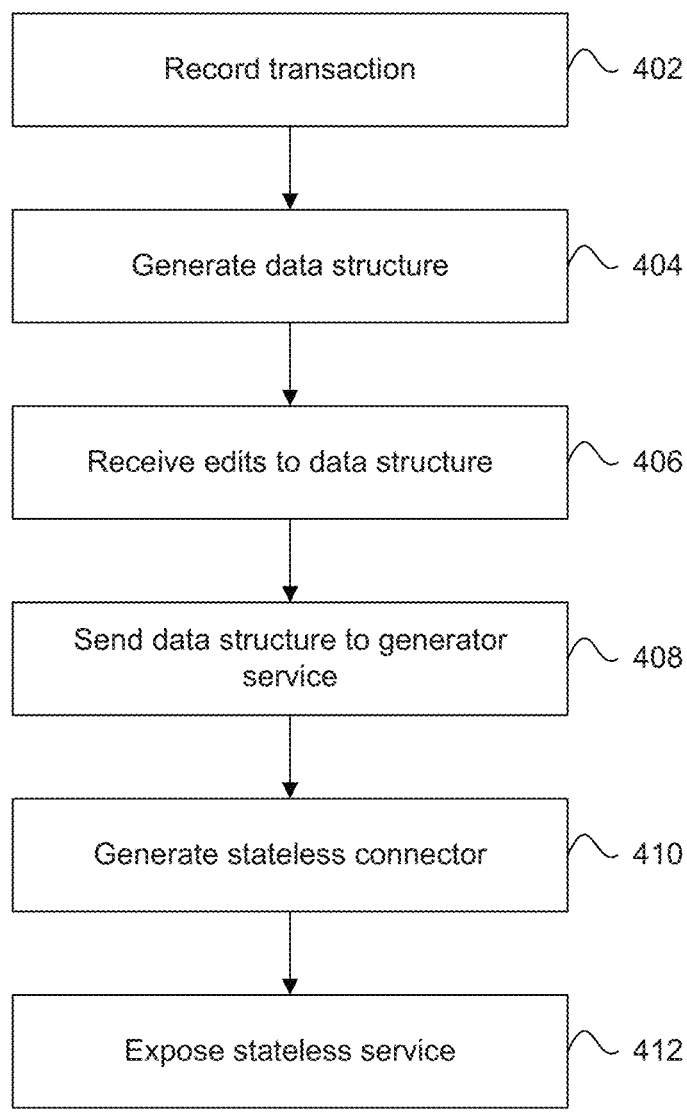
FIG. 4 is a flowchart illustrating a method of recording a transaction and generating a stateless connector, according to some embodiments.

FIG. 4 is a flowchart illustrating a method of recording a transaction and generating a stateless connector, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, cloud platform 110 may engage transaction recorder 112 to record a transaction conducted by user 102A within an application running in cloud platform 110. Transaction recorder 112 may allow user 102A to complete a particular business process, i.e., a dynamic program within the application. The dynamic program may be a sequence of steps performed within an application. To record the transaction, transaction recorder 112 may provide an interface through which user 102A may connect to a stateful version of the application that connects to backend systems 116. An exemplary interface for transaction recorder 112 is displayed above with reference to FIGS. 2 and 3. Through this interface, user 102A may complete a dynamic program within the application. Recorded steps may involve input fields, i.e., a user-interface control or input (e.g., a value entered in a text field). Recorded steps may involve output fields, i.e., a user-interface control that is part of the state after the last step of a sequence is executed. Recorded steps may also involve operations performed by the application against the stateful backup. For example, in an exemplary banking application, a transaction may be an update to account information, a viewing of an account balance, the paying of a bill, etc. Within the viewing-of-an-account-balance transaction, for example, steps may include viewing various fields related to multiple accounts on a home page, selecting an appropriate account, and clicking a "view balance" button. In this example, transaction recorder may receive appropriate input fields such as the account balance field. Output fields may be derived data displayed on the balance page. Operations may include calls to the backend system to retrieve information, to update information, to add information, etc. As portrayed in the exemplary screen display in FIG. 3, user 102A may also enter additional fields and additional information into the interface while completing the recording with transaction recorder 112. For example, user 102A may enter a field label to be associated with an input-field or change the type of the field and these details will be used in subsequent steps when building the stateless connector.

In 404, cloud platform 110 may engage transaction recorder 112 to generate a data structure based on the input transaction received in 402. The data structure may be any suitable data structure that documents the sequence of steps in the transaction. The data structure may represent input fields, output fields, operations performed against backend system 116A, and other suitable descriptive and useful fields. In an embodiment, the data structure may be a Javascript Object Notation (JSON) file or other file adhering to a text-based data-interchange format that is human-readable. In another embodiment, a machine-readable format may be derived by transaction recorder 112. Transaction recorder 112 may store the data structure by engaging storage service 122 or through alternative means. In an embodiment, the data structure may contain a collection of name/value pairs written in an appropriate fashion to represent the recorded sequence of steps. The data structure may describe sequences completed, the steps completed in those sequences, the input and output fields within the sequences, and detailed information about the calls to the stateful backend system performed within the transaction. A sample JSON file derived by transaction recorder 112 is displayed below. For readability and brevity, this exemplary file is simplified:
{
  "createdAt": "2019-10-01T15:48:47.076666666Z",
  "createdBy": "user-name",
  "name": "patent-demo",
  "sequences": [{"steps": ["fields": [
  "label": "User Name"
  "isInputField": true
  "Calls: "[{
    "payload": {
      "content: "{{content} }",
      "post": "value/{{sid} }"
    }
    "recordedValues": {"content:" "User Name 1"}
  },
  ]]}]
}
One skilled in the relevant art(s) will understand that a derived JSON file may contain a large number of additional fields documenting the transaction, and the above example is merely exemplary. In an embodiment, the payload information may represent calls made to the stateful backend system and the recorded values may represent input fields entered by user 102A.

In 406, cloud platform 110 may engage transaction recorder 112 to receive additional edits to the data structure derived in 404 from user 102A. Transaction recorder 112 may display the data structure to a user in a suitable interface and receive manual edits from the user. For example, user 102A may relabel input and output fields to associate the fields with a more familiar name when the stateless connector is created. Transaction recorder 112 may preserve this information in the data structure. In an embodiment, the data structure is a JSON file and transaction recorder 112 may employ any suitable tool to view, edit, format, and validate the JSON file based on the user needs. For example, user 102A may aim to edit the label of a field inputted when the transaction was previously recorded. Thus, user 102A may make the update directly to the human-readable text by replacing the default label with a user-entered value.

In 408, cloud platform 110 may engage transaction recorder 112 to send the data structure derived in 404 (and potentially edited in 406) to stateless connector generator 124 provided by mobile services 120. Transaction recorder 112 may send the file in response to a specific user command to deploy the file and receive additional parameters needed to complete the action. In an embodiment, cloud platform 110 may automatically send the data structure to stateless connector generator 124 when the transaction is finalized.

In 410, stateless connector generator 124 may create stateless connector 130 based on the data structure derived from the recording. In an embodiment, stateless connector generator 124 may a common schema definition language format file, entity data model designer file, other XML file, or other suitable file or data structure that defines an entity model to be exposed by an OData service. Such a definition file may be used in subsequent steps to expose a stateless service and to harness existing functionalities provided by the standardization of the system (e.g., functions provided by OData services 140). Such an XML file may provide appropriate header information and define types, properties, and actions corresponding to the recorded transaction. A merely exemplary file is displayed below. This is also greatly simplified for brevity and readability and a person of skill in the relevant art(s) would understand that a file derived from a transaction may be vastly more complex:
<?xml version="1.0" encoding="utf-8"?>
<edmx:Edmx Version="4.0" xmlns:edmx="URL" xmlns: xsi="URL"
xsi: schemaLocation="URL">
<edmx:DataServices>
<Schema Namespace="namespace" Alias="Self" xmlns="xmlnamespace">
<ComplexType Name="GetUserDetailsForDemoRoleAssignmentsEntry">
  <Property Name="EndDate" Type="Edm. String" Nullable=false/>
  <Property Name=Role" Type="Edm. String" Nullable=false/>
  <Property Name="ShortRoleDescription" Type="Edm. String" Nullable=false/>
  <Property Name="StartDate" Type="Edm. String" Nullable=false/>
</ComplexType>
<ComplexType Name="INPUT_FindUserForUiPsDemo">

```
<Property Name="BuildingCode" Type="Edm.String"
    Nullable="false" DefaultValue="FRA01"/>
<Property Name="FirstName" Type="Edm.String"
    Nullable=true/>
<Property Name="LastName" Type="Edm.String"
    Nullable=true/>
</ComplexType>
<ComplexType
Name="OUTPUT_FindUserForUiPsDemo">
    <Property Name="UserList" Type="Collection(Self.FindUserForUiPsDemoUserListEntry)" Nullable=false/>
</ComplexType>
<ComplexType Name="RESPONSE FindUserForUiPsDemo" BaseType="SelfResponse">
    <Property Name="Output"
        Type="Self.OUTPUT_FindUserForUiPsDemo"
        Nullable=true/>
</ComplexType>
<Action Name="GetUserDetailsForDemo">
    <Parameter Name="Session" Type="Self Session"
        Nullable=false/>
    <Parameter Name="Input" Type="Self INPUT GetUserDetailsForDemo" Nullable=false/>
    <ReturnType Type="Self RESPONSE GetUserDetailsForDemo" Nullable=false/>
</Action>
</Schema>
</edmx:DataServices>
</edmx:Edmx>
```

In addition to the input fields, output fields, and operations/actions performed in the transaction, the derived file may also include information needed to instantiate a stateless service, e.g., URLs, authentication credentials, and other suitable information.

In 412, cloud platform 110 may employ deployment service 126 to expose a stateless service via stateless connector 130. Deployment service 126 may perform a variety of validations, for example, by examining/parsing the XML file created in 410 to assure its syntactical correctness. Deployment service 126 may allow user 102A to determine an appropriate tenant or resource to deploy the service onto. Once, deployed, the stateless service may allow applications to perform the stateful transactions conducted when recording the transaction in 402 in a stateless application, such as a mobile application. The mobile application may connect to the stateless service to receive the information about the functions and fields provided through/by the connector. The mobile application may then call the exposed methods and functions from a subsequently developed mobile application to receive the output and input fields and to call methods that perform operations against the backend system. Additionally, the mobile application developer may use the deployed stateless connector to automatically generate templates based on the transaction.

Figure 5:
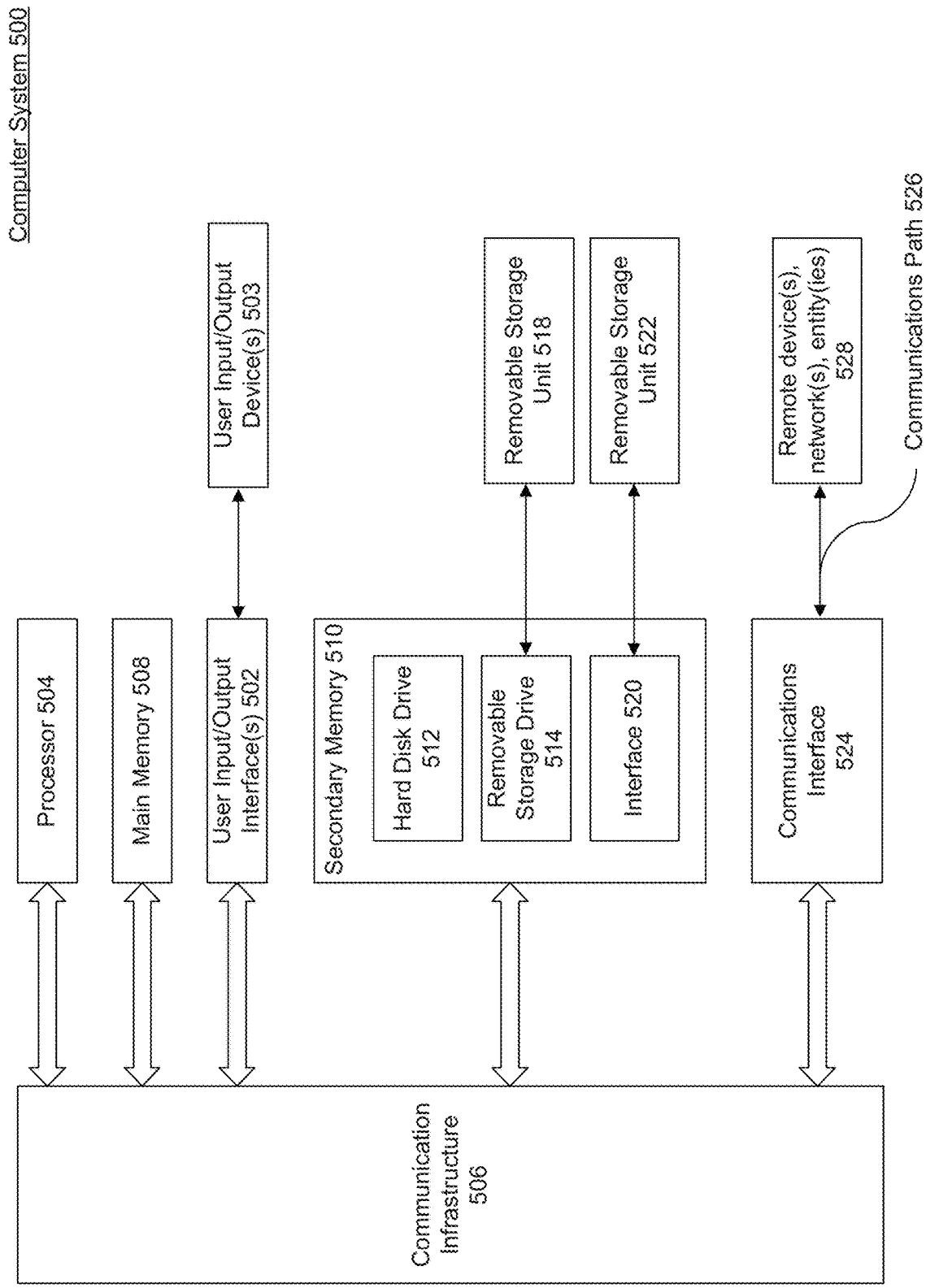
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   recording, by one or more processors, a transaction executed on an application in a cloud platform, wherein the application accesses a backend system using a stateful protocol;
   generating, by the one or more processors, a data structure that describes the transaction, wherein the data structure comprises an input field, an output field and an operation performed using the stateful protocol while completing the transaction;
   sending, by the one or more processors, the data structure to a generator service configured to generate a stateless connector; and
   exposing, by the one or more processors, a stateless service in the cloud platform using the stateless connector, wherein the stateless service allows the transaction to be performed on a mobile device by a mobile application using a stateless protocol.

2. The method of claim 1, wherein the stateless service exposes stateless actions corresponding to the operation performed against the backend system using the stateful protocol.

3. The method of claim 1, wherein the stateless service exposes the input field and the output field for use in the mobile application.

4. The method of claim 1, the recording further comprising:
   receiving, by the one or more processors, an additional field via an input in a user interface during the recording of the transaction;
   receiving, by the one or more processors, an input related to the additional field; and
   including, by the one or more processors, the input in the data structure.

5. The method of claim 1, further comprising:
   displaying, by the one or more processors, the data structure in a user interface;

receiving, by the one or more processors, an edit to the data structure; and updating, by the one or more processors, the data structure to include the edit prior to sending the data structure to the generator service.

6. The method of claim 1, wherein the stateless service allows the transaction to be performed by an automation tool.

7. The method of claim 1, wherein the stateless service operates using an open data protocol.

8. The method of claim 7, further comprising:

receiving, by the one or more processors, metadata from the stateless service; and automatically generating, by the one or more processors, a mobile application template to complete the transaction based on the received metadata.

9. The method of claim 1, wherein the transaction comprises a sequence of one or more steps.

10. A system, comprising:

a memory; and at least one processor coupled to the memory and configured to:

record a transaction executed on an application in a cloud platform, wherein the application accesses a backend system using a stateful protocol;

generate a data structure that describes the transaction, wherein the data structure comprises an input field, an output field, and operation performed using the stateful protocol while completing the transaction;

send the data structure to a generator service that generates a stateless connector; and expose a stateless service in the cloud platform using the stateless connector, wherein the stateless service allows the transaction to be performed on a mobile device by a mobile application using a stateless protocol.

11. The system of claim 10, wherein the stateless service exposes stateless actions corresponding to the operation performed against the backend system using the stateful protocol.

12. The system of claim 10, wherein the stateless service exposes the input field and the output field for use in the mobile application.

13. The system of claim 10, wherein to record the transaction the at least one processor is further configured to:

receive an additional field via an input in a user interface during the recording of the transaction;

receive an input related to the additional field; and include the input in the data structure.

14. The system of claim 10, the at least one processor further configured to:

display the data structure in a user interface;

receive an edit to the data structure; and update the data structure to include the edit prior to sending the data structure to the generator service.

15. The system of claim 10, wherein the stateless service allows the transaction to be performed by an automation tool.

16. The system of claim 10, wherein the stateless service operates using an open data protocol.

17. The system of claim 16, the at least one processor further configured to:

receive metadata from the stateless service; and automatically generate a mobile application template to complete the transaction based on the received metadata.

18. A non-transitory computer-readable device having instructions stored thereon that, when executed by at least one computing device, cause the at least one computing device to perform operations comprising:

recording a transaction executed on an application in a cloud platform, wherein the application accesses a backend system using a stateful protocol;

generating a data structure that describes the transaction, wherein the data structure comprises an input field, an output field, and an operation performed using the stateful protocol while completing the transaction;

sending the data structure to a generator service configured to generate a stateless connector; and exposing a stateless service in the cloud platform using the stateless connector, wherein the stateless service allows the transaction to be performed on a mobile device by a mobile application using a stateless protocol.

19. The non-transitory computer-readable device of claim 18, the operations further comprising:

receiving an additional field via an input in a user interface during the recording of the transaction;

receiving an input related to the additional field; and including the input in the data structure.

20. The non-transitory computer-readable device of claim 18, the operations further comprising:

receiving metadata from the stateless service; and automatically generating a mobile application template to complete the transaction based on the received metadata.

\* \* \* \* \*